June 7, 1932.  A. RUEF  1,862,320

PRESS BUTTON LOCK

Filed Dec. 6, 1928

Witnesses:-

Inventor:-
August Ruef

Patented June 7, 1932

1,862,320

UNITED STATES PATENT OFFICE

AUGUST RUEF, OF FREIBURG, GERMANY

PRESS-BUTTON LOCK

Application filed December 6, 1928, Serial No. 324,239½, and in Germany April 10, 1928.

Various forms of interlocking members united by pressure for sealing letters and locking other objects together, are already known, whereby an unauthorized opening of the respective objects is prevented.

None of these however have thus far been generally adopted for the reason, that they have been too expensive to make and too troublesome to use and, in a certain sense, have not answered their purpose.

The fastener, according to the present invention, meets with all the demands made upon such a contrivance, since it is so simple, that it can be employed, without the slightest trouble and is inexpensive to make. An undetachable union of two tubular shanks is made use of in the present invention to retain the integrally formed flanges of peculiar contour in clamping engagement with the papers or other objects which are thus inextricably joined together.

The clamping flanges or base-plates of the interlocking members may be fluted, corrugated or otherwise suitably formed to clamp paper, etc. together in such a way that it cannot be extricated. For this purpose, said members may be made cone-shaped or cylindrical.

Moreover, they may be provided with helical ribs or threads for drawing them together.

The interlocking members with their plates or flanges are simply pressed flat together without any kind of spikes or similar devices. This construction furthermore requires no remodelling of the parts which are retained firmly and inextricably in clamping engagement with the interposed material.

In the accompanying drawing, the contrivance has been illustrated by way of an example:

Figure 1:
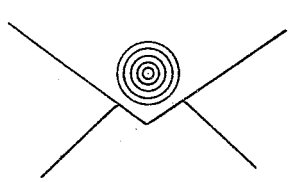
Figure 1 is a fragmentary plan view of an envelope sealed by my improved fastener.
Figure 3:
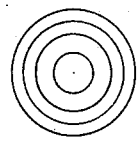
Figures 3 and 4 are plan-views of the parts before engagement.
Figure 4:
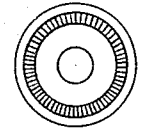
Figure 2:
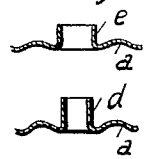
Figure 2 is an axial section of the interlocking members before their engagement.
Figure 6:
Figure 6 is a fragmentary section of the united parts.
Figure 5:
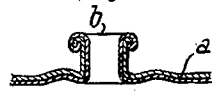
Figure 5 is an axial section of the interlocked parts.

As shown on the drawing, the two parts are similarly formed with one of the shanks smaller than the other for insertion therein. Thus each interlocking member consists of a base-plate $a$, with punched, or stamped-out opening extended upwards to form an open ended cone or cylinder. The tubular shank of the lower part $d$ is somewhat longer than the shank $e$ of the upper part. The opening of the upper part $e$ is somewhat larger in diameter than the circumference of the shank $d$ of the lower part, so that the latter can be pushed therethrough. There are consequently two tubular shanks with plates, or flanges adapted to be joined together by an axial movement after which the outer ends of the tubular shanks may be rolled together as illustrated in Figs. 5 and 6.

In order, that the paper, or other material may be retained between the flanges $a$, $a$, said flanges may be corrugated or otherwise made uneven. The interposed paper can thus be clamped so securely together that it cannot thereafter be withdrawn without destroying the material.

The surface of these flanges may be provided with a suitable roughing, fluting, etc. so that the paper, placed between the same, cannot be extricated. Fig. 5 shows the locked parts, $a$ being the plate of the upper part, while $b$ indicates the upset outer ends of the cones or cylinders.

The several parts may be so proportioned that when the edges of the tubular shanks have been upset, an approximately flat disc is produced, so that no inconvenient projection or unevenness exists. This upsetting or deforming of the shanks may be effected by a simple punch, which simultaneously perforates the paper for permitting the passage of the plug shank therethrough. The upset portions of said shanks may be so compressed by a blow or pressure as to positively prevent the insertion of an instrument for the purpose of opening an envelope, for example.

If an attempt is made to file the roll through, in order to separate the two parts of the fastener, the rolled ring may be split off and the rolled up parts bared, but the parts can not be filed through in themselves without injuring the envelope considerably since there is no room left for the to and fro motion of the file.

Figure 7:
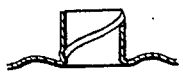
Figure 7 shows one of the interlocking members provided with a helical rib or thread.

It will be understood from Figure 7 that the inner tubular shank may be provided with a helical rib or thread whereby the outer tubular shank when provided with a corresponding rib or groove may be drawn into binding engagement by a short turn of the latter.

I claim:

1. A paper fastener comprising separately-constructed interlocking members, each of said interlocking members consisting of a tubular shank constructed with a solidly-formed cylindrical wall and provided with a circular clamping flange, said clamping flanges being provided with wavy cross-sections and the tubular shank of one of said interlocking members being insertable axially into the tubular shank of the other of said interlocking members to bring the wavy flanges into interlocking clamping engagement with the papers to be clamped, the ends of said tubular shanks distant from said wavy flanges being upset and permanently riveted together to retain said wavy flanges in positive clamping engagement with the interposed papers.

2. A paper fastener according to claim 1, in which said tubular shanks are provided with interengaging helical threads for forcing said wavy flanges into clamping engagement with the papers.

In testimony whereof I affix my signature.

AUGUST RUEF.